M. WEINRICH.
Treatment and Preparation of Saccharine Substances.
No. 234,510. Patented Nov. 16, 1880.
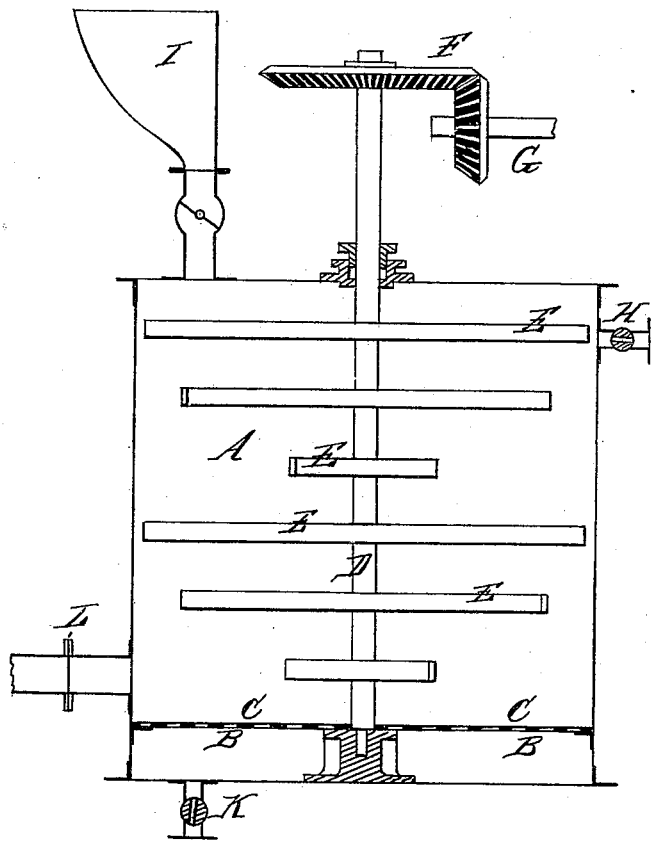

UNITED STATES PATENT OFFICE.

MORIZ WEINRICH, OF VIENNA, AUSTRIA.

TREATMENT AND PREPARATION OF SACCHARINE SUBSTANCES.

SPECIFICATION forming part of Letters Patent No. 234,510, dated November 16, 1880.

Application filed August 2, 1879. Patented in Austria and Hungary December 1, 1878, in Germany July 17, 1878, in France August 22, 1878, in Belgium August 14, 1878, in Italy March 31, 1879, and in England August 17, 1878.

*To all whom it may concern:*

Be it known that I, MORIZ WEINRICH, of Vienna, in the Empire of Austria, have invented a new and useful Process for the Treatment and Preparation of Saccharine Substances, (for which I have obtained Letters Patent in Austria and Hungary, dated December 1, 1878; in Germany, dated July 17, 1878; in France, dated August 22, 1878; in Belgium, dated August 14, 1878; in Italy, dated March 31, 1879; and in England, dated August 17, 1878;) and I do hereby declare that the following is such full, clear, and exact description thereof as will enable others skilled in the art to understand and use my invention.

Generally my invention relates to processes for the more ready and complete extraction of sugar from molasses, whether the molasses be produced from cane or beet-root.

My process results in the production of purified sucrate of lime in the proper condition to have the sugar extracted therefrom; which sucrate of lime is a compound of lime and sugar, and from which substance the sugar can be readily extracted, as will be more fully explained farther on.

My invention consists in the hereinafter-described process of obtaining sugar from molasses; and, as subsidiary to and constituting a step in that process, it also consists in the hereinafter - described process of producing purified sucrate of lime.

In order that they may be better understood, and to avoid repetition, I reserve the succinct definitive statement of what constitute these processes until after I have described them fully in detail, together with the manner of practicing them, when I will specify them briefly and distinctly in my claims.

In the ordinary practice of refining cane or beet-root sugar a certain amount of saccharine matter is necessarily combined with the molasses, which saccharine matter it is often desirable to extract. For this purpose my process is both cheap and certain.

I take the molasses to be treated, and after ascertaining the amount of saccharine substance contained in it, I mix with the molasses dry-slaked lime, (powdered hydrate of lime.) If the quantity of molasses being treated contains, say, one hundred pounds of sugar, I mix with this mass fifty pounds of the dry-slaked lime, calculated when in its anhydrous condition.

If the lime is mixed with adulterating substances, enough of the adulterated lime must be used to give fifty per cent. of the weight of the sugar contained in the molasses of pure lime. As it is difficult always to obtain an absolutely uniform mixture of molasses and lime, it is advisable to use a little larger percentage of lime than is theoretically necessary—say about fifty-five per cent. of lime, by weight, to one hundred parts, by weight, of the sugar contained in the molasses.

Of course my process is best carried out when pure lime of the kind referred to is used.

The lime is mixed by stirring it in with the molasses (which latter is preferably heated up to about 150° or 200° Fahrenheit) in the most convenient vessel for carrying on such an operation. When the admixture is thoroughly effected the molasses mixed with the lime is poured out into any convenient vessels, in which the thick liquid may remain while cooling and until it becomes stiff. The vessels used are preferably small, containing, say, from fifty to one hundred gallons, and it is better that they should be placed in a room slightly warmed above the ordinary temperature—say of 80° Fahrenheit or a little above.

At the expiration of about twenty hours it will be found that the molasses and lime are no longer in a semi-liquid condition, but that the containing-vessels are filled with a dry mass, which can be easily removed from the vessels in which the cooling took place. I call this substance "melassate of lime," and it is a tribasic sucrate of lime mixed with the impurities of the molasses, the proportions of the lime and sugar used having been such as to form tribasic sucrate.

The melassate of lime, when removed from the cooling-vessels, is broken up into small pieces of about half the size of a man's thumb. The pieces may, however, be as small as very fine shot. The material is easily pulverized or broken, and if large quantities are to be operated upon it can best be done by using percussion-mills, such as are described in the English patent to Carr, or the American patent to Van Buren Ryerson.

The melassate of lime should not be powdered to the condition of flour; but should it by chance be so finely divided its subsequent use must be accompanied by an admixture of gravel or not so finely-pulverized material, the word "gravel" being used to express the broken melassate of lime when pulverized to the proper degree. The pulverized melassate of lime is now ready for further treatment, and this is best effected in a closed vessel having stirring-arms, the construction of which I shall describe farther on. The vessel having stirring-arms is partly filled with alcohol of about seventy per cent. purity, and in this alcohol the pulverized melassate of lime is placed. The arms are set in motion, and the mass, now again in a semi-liquid condition, is thoroughly agitated. After a few minutes of this stirring operation the mass will be in the desired condition for further treatment with lower grades of alcohol. The mass will be found after this treatment to resemble sand or be in a granular condition, and for that reason I call it "sandy melassate of lime." When in this condition it can be readily treated by subsequent washing operations without danger of caking, and to the very best advantage.

The time occupied by the alcohol treatment for the purpose of producing sandy melassate of lime from the melassate of lime introduced into the stirring-vessel will vary. It depends, first, on the size of the particles of melassate of lime, and, second, on their hardness. Particles of melassate of lime measuring about one-tenth of an inch in diameter and of usual hardness require a little less than eight minutes for their complete penetration by the alcohol. If larger, more time will be required, and if smaller, less time.

The hardness of the particles of melassate of lime depend somewhat upon the temperature of the molasses when mixed with the lime at the commencement of the operation. The hotter the molasses the harder will be the melassate of lime resulting from the mixture, and the greater the length of time required to form the sandy melassate of lime.

Within the limits previously given, (or substantially within them,) I consider that the best results are to be arrived at by always using the highest temperature for the molasses when it is to be mixed with the lime, as previously described. This production of sandy melassate of lime I consider as a most essential step in my process, and as the one which enables the subsequent washing to be carried on with ease and economy. This further treatment, which is in effect a further step in my process, may be carried on in the mixing-vessel or in separate tanks or vessels, as is found most convenient. As, however, the second treatment with alcohol is, I think, most conveniently conducted in the mixing-tank in which the sandy melassate of lime was formed, it is my practice to carry it out in that vessel. This second treatment with alcohol consists simply in continually adding alcohol to the sandy mass in the mixing-vessel for the purpose of washing or carrying out the impurities mixed with the sandy melassate of lime. Alcohol may be used in this washing operation of a grade as low as forty per cent. pure alcohol in the solution. The alcohol is to be added and is to be allowed to pass through the mass, carrying with it the impurities which it is desired to wash out. If the alcohol is not, after its first use, impregnated with too large an amount of washings, it may be used over again directly upon another mass of material in another mixing-vessel, the mass in which has not been as thoroughly washed as that through which the alcohol has just passed.

The arms of the mixing-vessel may with advantage be revolved during this washing operation, and the alcohol, when it has performed its work, is to be drawn from the tank or mixer, and a fresh quantity poured in at the top of the vessel. After ten or twelve hours the washing operation will be found to be completed, although this time will vary, depending upon the purity of the alcohol used, and also depending upon the manner of carrying out the washing operation. If carried out in the mixing-vessels, with the arms in motion, a slightly less time will be required, but if carried out in tanks without stirring, a greater time will be required. The length of time occupied in this washing operation will also be affected by the length of time occupied in producing the sandy melassate of lime. If the melassate of lime is hard, the time occupied in producing the sandy melassate of lime will be increased, but the time occupied in the washing and cleansing of the sandy melassate of lime will be decreased. As to the length of time during which each charge of alcohol is to be left upon the sandy material to be washed, no precise period can be stated; but the attendant must observe, by drawing off some of the liquid and testing it, whether he considers that it has done its work efficiently. This washing operation may be continuous. At the expiration of the washing operation, occupying from ten to twelve hours, the granulated contents of the tank or mixer are to be removed through the proper opening, and the mass is allowed to remain in any convenient vessel, while the alcohol which may have been carried out with it evaporates. This evaporation may be aided by a little heat, and the alcohol be thus distilled off.

The washed mass, when dried, will be found to consist of a purified sucrate of lime, from which the sugar may be easily obtained by dissolving the mass in water with heat and treating in saturating-vessels, or it may be directly utilized for the production of sugar by the decomposition of the sucrate with carbonic acid.

I will now describe one of the forms of mixing-tank which may be used to produce the sandy melassate of lime, and in which the subsequent purification of this material may, if desired, be carried out. The mixing-tank may be of any size found most convenient. Following the proportions of the annexed drawing, the tank might measure, from the perforated bottom to the cover or top, say, ten feet.

The drawing shows a vertical section of this apparatus.

A is a tank, closed, with the exception of the openings to be described. It is provided with a perforated false bottom, B, which is preferably made of wire-netting or the like. Upon the upper side of this division B rests a thickness of linen or canvas cloth, C. The vertical shaft D has attached to it mixing-arms E E, and this shaft is caused to revolve by the gears F G, the latter being driven by power.

H is the cock or opening through which alcohol is introduced for forming the sandy melassate of lime, or which is likewise used as the inlet-orifice for the alcohol when the mixing-tank is used for the washing of this sandy melassate of lime. The broken melassate of lime is introduced through the opening I, which is preferably funnel-shaped.

The cock K at the bottom of the vessel serves to draw off the alcohol after it has completed its work upon the substances in the tank A.

The opening at L is used to remove the treated mass from the tank, and should be provided, as should all the other openings, with the proper closing mechanism. As has been already fully described, this mixing-tank may be used for the subsequent washing operation, as well as for the production of sandy melassate of lime, for which purpose, however, it is primarily intended.

The washing of the sandy melassate of lime may, if desired, be carried out in the ordinary bag-filters used in sugar-refineries. No special form of apparatus is essential to this process.

It is advisable that the alcohol used in carrying out my process, after becoming too impure for further use, be distilled and reused. Under the term of "alcohol" I include methyl-alcohol as well as ordinary alcohol.

It will be observed that no high degree of heat is used in any part of my process, and that likewise no heat injurious to the materials is developed by the chemical action of the substances upon one another, and this I consider as important.

Although in the beginning of this specification I advise that a slightly greater quantity of lime be used than fifty per cent. of the weight of the sugar contained in the molasses, I do not intend to imply that an excess of lime should be used, or more than is necessary to produce the desired result. The proportions given are about right, and any further addition of lime would be wasteful and deleterious, the slight excess referred to being merely mentioned as necessary for the purpose of obviating the errors incident to mixtures not made with absolute accuracy.

From the foregoing description it will be obvious that leading features and essential steps in my process consist in mixing heated molasses with the requisite quantity of dried powdered hydrate of lime for the formation of the tribasic sucrate of lime in a homogeneous mass, then mixing, when broken up, with alcohol, so that I obtain the sucrate in a granular form, and washing with alcohol. In the granular form and homogeneous state the sucrate can be more readily washed than in the forms and conditions in which it is obtained when, as has heretofore commonly been the custom, the molasses in a cold state is mixed with dry-slaked lime in greater quantities than required for the chemical combination, or mixed with lime-water or with caustic powdered lime.

I do not here claim the process of producing sandy melassate of lime, nor the product thus named, having reserved them for a separate application for patent, filed August 4, 1879.

What I here claim as new, and desire to secure by Letters Patent of the United States, is—

1. The process herein described of obtaining sugar from molasses, which consists in first mixing warmed molasses with dry powdered hydrate of lime, then pulverizing the dried product of this mixture and mixing it with alcohol, then washing the previously-treated mass with alcohol, and, finally, extracting from the washed mass the sugar, all these steps being carried out substantially as and in the order set forth.

2. In the art of obtaining sugar from molasses, the process herein described of producing purified sucrate of lime, which consists in first mixing together warmed molasses and dry powdered hydrate of lime, then pulverizing the dried product of this mixture and mixing it with alcohol, and, finally, washing the previously-treated mass with alcohol, all these steps being carried out substantially as and in the order set forth.

MORIZ WEINRICH.

Witnesses:
  Dr. ED. SCHMIDT, C. E.,
  CARL HAHN.